US008207890B2

(12) United States Patent
Venkatraman et al.

(10) Patent No.: US 8,207,890 B2
(45) Date of Patent: Jun. 26, 2012

(54) PROVIDING EPHEMERIS DATA AND CLOCK CORRECTIONS TO A SATELLITE NAVIGATION SYSTEM RECEIVER

(75) Inventors: Sai Venkatraman, Santa Clara, CA (US); Janne Jarpenvaa, Tampere (FI); Qinfang Sun, Cupertino, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 726 days.

(21) Appl. No.: 12/247,817

(22) Filed: Oct. 8, 2008

(65) Prior Publication Data

US 2010/0085247 A1    Apr. 8, 2010

(51) Int. Cl.
*G01S 19/25* (2010.01)
(52) U.S. Cl. .................................................. 342/357.64
(58) Field of Classification Search ... 342/357.2–357.78
See application file for complete search history.

(56) References Cited

U.S. PATENT DOCUMENTS

| 5,731,786 | A | 3/1998 | Abraham et al. |
| 5,731,787 | A * | 3/1998 | Sheynblat ................ 342/357.24 |
| 6,651,000 | B2 | 11/2003 | van Diggelen et al. |
| 7,545,317 | B2 * | 6/2009 | Han ........................ 342/357.64 |
| 2003/0132878 | A1 | 7/2003 | Devereux et al. |
| 2005/0146461 | A1 | 7/2005 | Pande et al. |
| 2007/0103364 | A1 | 5/2007 | Garin et al. |
| 2007/0247354 | A1 | 10/2007 | Garin |
| 2007/0273581 | A1 | 11/2007 | Garrison et al. |
| 2007/0299609 | A1 | 12/2007 | Garin et al. |
| 2008/0018527 | A1 | 1/2008 | LaMance et al. |
| 2008/0186228 | A1 | 8/2008 | Garin et al. |
| 2008/0246653 | A1 | 10/2008 | Lin et al. |
| 2009/0237302 | A1 * | 9/2009 | Derbez et al. ............ 342/357.15 |
| 2011/0032147 | A1 | 2/2011 | Venkatraman et al. |

FOREIGN PATENT DOCUMENTS

| EP | 1953561 A2 | 8/2008 |
| EP | 2350681 A1 | 8/2011 |
| TW | 201015101 | 4/2010 |
| TW | 201131185 | 9/2011 |
| WO | WO 2010/042092 | 4/2010 |
| WO | WO 2011/112211 | 9/2011 |

OTHER PUBLICATIONS

International Search Report—PCT/US2010/046388, ISA/US, Nov. 2, 2010.
International Search Report and Written Opinion—PCT/US2008/013561, ISA/US, Mar. 23, 2009.

* cited by examiner

*Primary Examiner* — Thomas Tarcza
*Assistant Examiner* — Nga X Nguyen
(74) *Attorney, Agent, or Firm* — Mahamedl Paradice Kreisman LLP

(57) ABSTRACT

A device can access scaled values and scaling factors, which are used to convert the scaled values into coefficients and residuals. The coefficients and residuals can in turn be used with time-dependent functions to reconstruct predicted ephemeris data, including clock correction data, for satellite navigation system satellites. Ephemeris data that is broadcast from any of the satellites can be used to update the calculated ephemeris data.

16 Claims, 5 Drawing Sheets

PROVIDING EPHEMERIS DATA AND CLOCK CORRECTIONS TO A SATELLITE NAVIGATION SYSTEM RECEIVER

BACKGROUND

The conventional approach to using global positioning system (GPS) satellites to determine a receiver's position requires the receiver to download navigation messages from four or more visible satellites, extract the broadcast ephemerides for each satellite from the navigation messages, and utilize this ephemeris data to compute the position of the satellites in the ECEF (earth-centered earth-fixed) coordinate system at a specific time. The broadcast ephemerides for each satellite are provided in a frame of data that takes about 30 seconds to send/receive. The broadcast ephemerides are valid for a period of four hours starting from the time the satellite starts to broadcast the navigation data. A control station uploads the data to the satellite less frequently, usually a couple of times a day. After a four-hour period, the receiver has to again download the latest broadcast ephemerides.

Under "warm" or "cold" start conditions, the GPS receiver may not have valid ephemerides, and so it may have to wait until at least four satellites have been acquired and their broadcast ephemerides extracted before estimating a position. This extends the time needed to acquire valid ephemerides to beyond 30 seconds, perhaps to several minutes, which may not be acceptable to a user.

Furthermore, under weak signal conditions, the signal-to-noise ratio of the signal from one or more satellites may fall below the receiver's threshold to decode the navigation message without substantial errors.

To overcome these types of issues, the GPS receiver can obtain ephemerides from, for example, a cellular network if the receiver has the capability to communicate with a wireless network via assisted GPS (A-GPS). Alternately, the ephemerides can be in the form of a file that is stored in memory at the receiver. This file may include ephemeris data for one or more satellites that is valid for several days. The file can be transmitted to the GPS receiver using a wireless medium, or a user can periodically connect the GPS receiver to the Internet and download the latest file from a known location. With assistance from the wireless network or from a stored file, the TTFF (time to first fix) can be reduced to a few seconds (on the order of 5-15 seconds).

However, the size of the file can be problematic. If the file is large, it can take a long time to transfer the file to a GPS receiver. There are usually costs associated with the file transfer. For example, the file may have to be transferred to the GPS device over a wireless link, or a user may have to connect the device to a computer that is linked to the server where the file exists in order to transfer download the file. The cost of transferring the file is usually proportional to the transmit time or the size of the file being transmitted. Also, the user may be inconvenienced by the amount of time it takes to download the file. Furthermore, if the GPS receiver is a mobile device or the like with limited memory capacity, then a large file may consume an inordinate share of device memory.

SUMMARY

According to an embodiment of the invention, a receiving (e.g., client) device can access a file containing scaled values (e.g., integer values) and scaling factors. The scaling factors are used to convert the scaled values into coefficients and residuals, which in turn can be used with time-dependent functions to calculate ephemeris data, including clock correction data, for satellite navigation system (e.g., GPS) satellites. The client device can use the calculated ephemeris data and clock corrections to determine a position (e.g., the location of the device).

By representing the ephemeris data, including clock correction data, using scaled values and scaling factors, the size of the file can be significantly reduced, in turn reducing the amount of time needed to transmit and/or download the file to the client device and also reducing the amount of device memory consumed by the file. According to embodiments of the invention, a week's worth of ephemeris data and clock correction data can be stored using less than about 15 kilobytes (KB) of file space. A file of this size is better by a factor of three to four in comparison to the case in which ephemeris data sets estimated from, for example, Jet Propulsion Laboratory data are accumulated every four hours and sent uncompressed.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
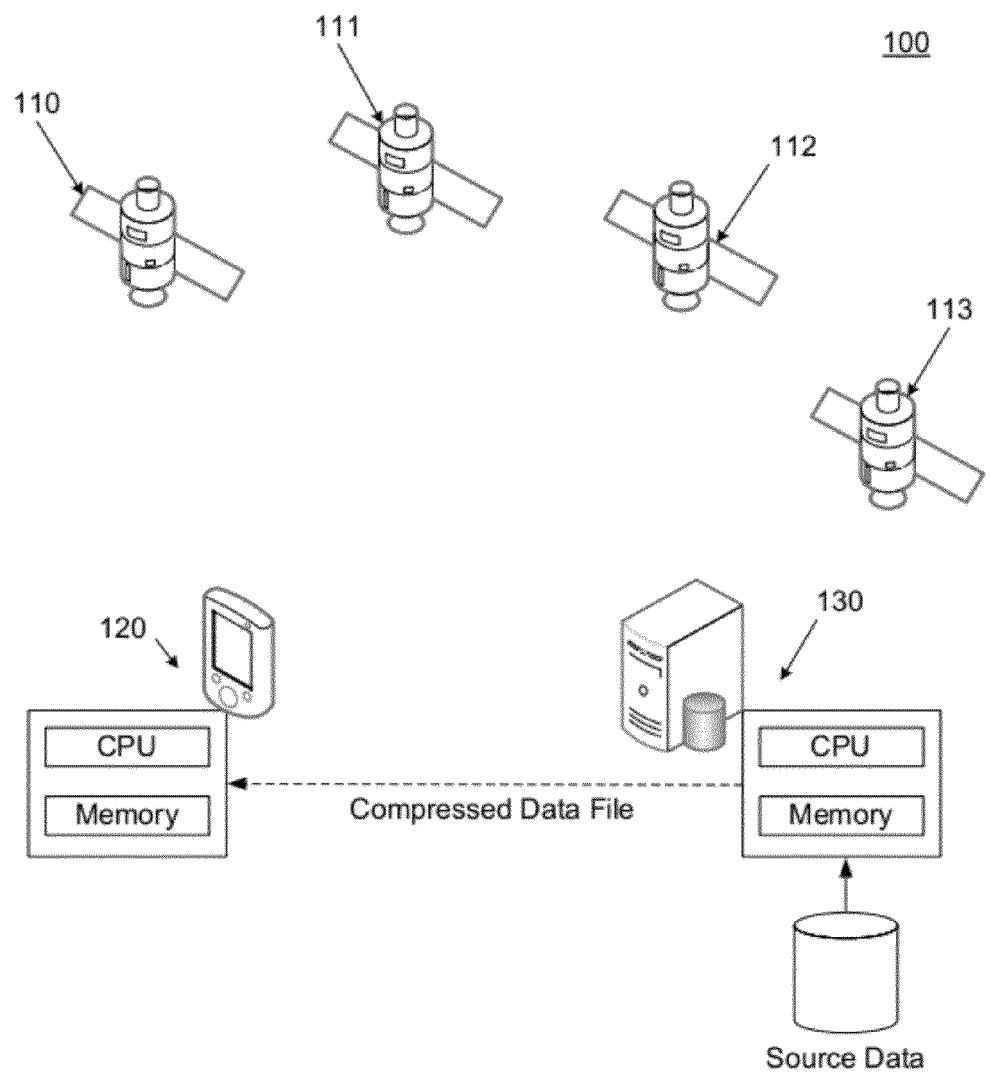
FIG. 1 is a block diagram of an example of a satellite navigation system according to an embodiment of the invention.

Some portions of the detailed descriptions that follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "broadcasting," "identifying," "adjusting," "converting," "updating," "determining," "compensating," "replacing," "evaluating," "calculating," "predicting," "using," "deriving," "representing," "storing," "fitting" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram showing elements of a satellite navigation system 100 according to one embodiment of the invention. The system 100 may include elements in place of or in addition to those shown and described herein. Generally speaking, the example of FIG. 1 includes only the rudimentary elements of a functional satellite navigation system. In one embodiment, the satellite navigation system is the global positioning system.

The system 100 includes a constellation of satellites, exemplified as satellites 110, 111, 112 and 113 (110-113), a client device 120 that includes a memory and a central processing unit (CPU) and may also include a wireless receiver, and a server 130, which also has memory and a CPU and may include a wireless transmitter. The client device 120 may be, but is not limited to, a cell phone or smart phone, a personal digital assistant, or a portable (or personal) navigation device.

The server 130 can send information to the client device 120 via a wired or wireless connection, either directly or indirectly (e.g., via an intermediate device of some sort). Alternatively, information may be transferred from the server 130 to the client device 120 using some type of portable computer-readable storage medium such as those mentioned above. Generally speaking, the client device 120 has access to information residing on the server 130.

In one embodiment, the client device 120 has the capability to receive and process satellite navigation system signals from the satellites 110-113. The satellite navigation system signals include ephemeris data and clock correction data. Generally speaking, the satellite navigation system signals include information that allows the client device 120 to determine its location.

According to embodiments of the invention, the server 130 receives raw data (source data) in the form of periodic satellite positions (ECEF x-y-z coordinates) and clock corrections for several days into the future from a source such as, but not limited to, the Jet Propulsion Laboratory (JPL). Orbital determination, prediction and propagation for satellites can be forecast with high accuracy. The source data may also include quality indicators for both the predicted satellite positions and clock corrections.

According to embodiments described herein, predicted ephemeris data and clock corrections, which may be collectively referred to herein as pseudo-ephemeris or synthetic ephemeris data, is derived at the server 130 from the source data. The pseudo-ephemeris data can be made available to the client device 120 in a compressed format within a binary file. The predictions are typically available for a period of several days. As will be seen from the discussion to come, the predicted clock corrections can be updated using broadcast ephemerides, if available, that are received during the period covered by the prediction. By estimating ephemerides from the source data and compressing the result, the ephemerides (including clock corrections) are formatted in a manner that facilitates transmission, storage and retrieval.

Figure 2:
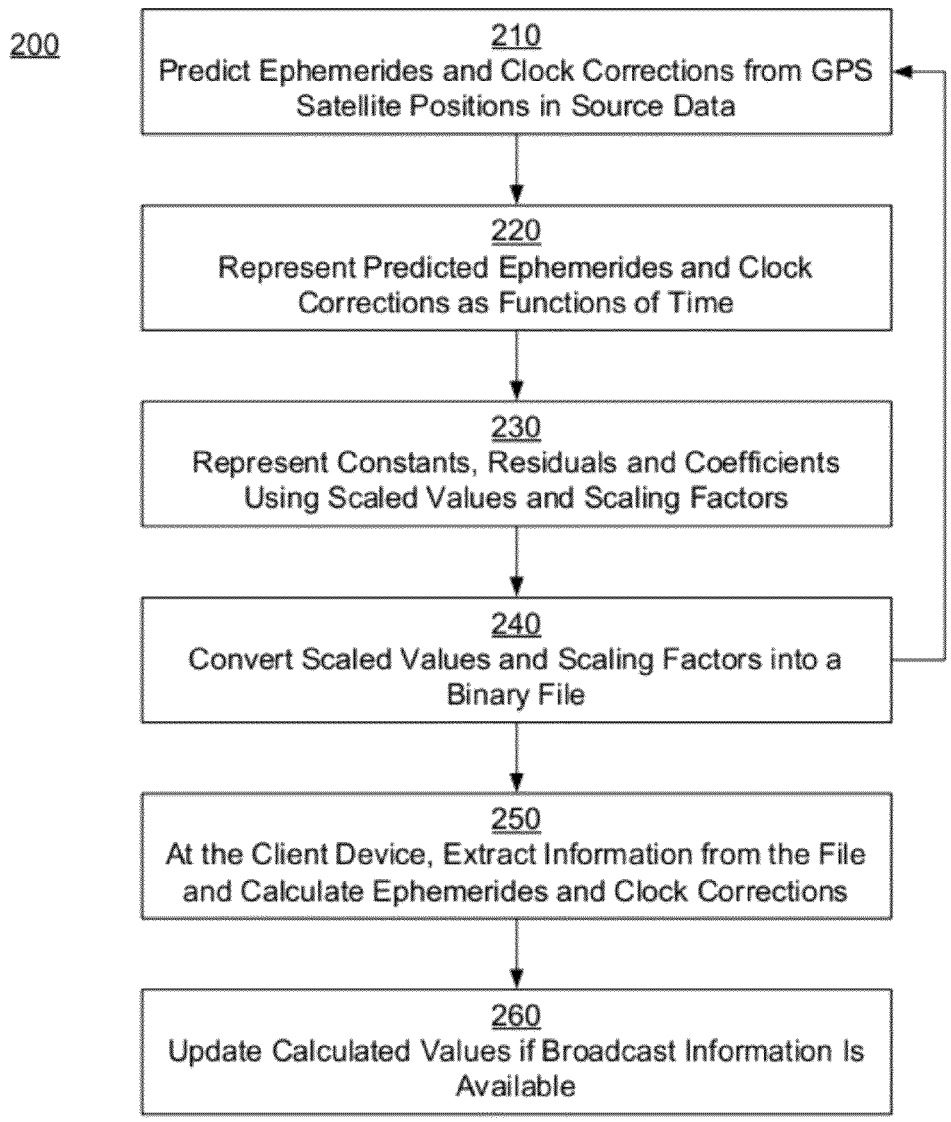
FIG. 2 is a flowchart of a method for providing ephemeris data and clock correction data to a satellite navigation system receiver according to various embodiments of the invention.

FIG. 2 includes a flowchart 200 that provides an overview of the process for estimating ephemerides from the source data and for providing the ephemerides in a format that reduces the amount of data transmitted to the client device 120. Accordingly, the amount of time needed to transmit and/or download the file to the client device, and the amount of device memory consumed by the file, are reduced.

In the discussion to follow, the term "predicted" is used to refer to data that is derived from raw source data in the form of satellite positions and clock corrections. The predicted data is compressed, as will be described, and the term "calculated" is used to refer to data that is calculated (reconstructed) from the compressed data. The term "broadcast" is used to refer to data that is broadcast from a satellite. In a sense, predicted data is used to forecast broadcast data, and calculated data (which is based on predicted data) is used in lieu of broadcast data.

In block 210, ephemeris parameters are estimated from raw (source) data that, as just noted, is in the form of periodic satellite positions (ECEF x-y-z coordinates) and clock corrections for several days into the future. In other words, instead of converting a set of ephemeris parameters to satellite positions in ECEF coordinates, the reverse operation of going from known satellite positions to a set of ephemeris parameters is performed.

The source data is not necessarily continuous; for example, the sequence of satellite positions and clock corrections may be provided at 15-minute intervals. The result of block 210 is a set of time-dependent and satellite-dependent ephemeris parameters and clock corrections. If the source data is spaced at 15-minute intervals, then at this point the predicted ephemeris parameters and clock correction data are also spaced at 15-minute intervals.

In block 220, the time-dependent values of each ephemeris parameter (excluding clock corrections, which are discussed below) are independently represented as a continuous function of time and other orbital parameters (see Table 1, further below). For example, a polynomial or trigonometric function can be fit to the data generated in block 210, with each parameter represented by a separate function or model. There may be differences between the values used to derive the function (the predicted values from block 210) and the values calculated when the function is subsequently evaluated. These differences, or residuals, can also be calculated for various time intervals. To reduce the amount of data in the binary file, the residuals can be determined as follows: if, for example, the predicted ephemeris parameters are determined at 15-minute intervals, then the residuals can also be determined at 15-minute intervals, but then a mean of the residuals for a period of four to six hours can be calculated and included in the binary file.

The clock corrections also vary with time, and in a similar manner the variation of the clock corrections can be represented as a sum of polynomial and harmonic curves. The clock correction term in the source (e.g., JPL) data can be curve-fit, and the coefficients of the curve can be represented using scaled values and scaling factors. The af0, af1 and af2 terms that correspond to the phase error, frequency error, and rate of change of frequency error, respectively, can be derived from the clock correction model when the ephemeris and clock corrections are reconstructed at the receiver.

In block 230, the coefficients and constants associated with the functions derived in block 220 are each represented as the product of a scaling factor and a scaled value such as a signed integer value. For example, a predicted ephemeris parameter may be represented as a time-dependent third-order polynomial with three coefficients and a constant, each of which can be represented as the product of a scaling factor and an integer. The coefficients for curve fit to the clock correction term can also be expressed as multiples of a scaling factor and a scaled value.

In block 240 of FIG. 2, with reference also to FIG. 1, the scaling factors and signed scaled values can be converted to the binary number system and written into a file that has a specific format known to the satellite navigation system receiver (e.g., the client device 120). Such a file can be about 15 KB in size, and may be as small as seven KB.

The file can be provided to the receiver in several ways. In one implementation, the client device 120 connects to a networked computer (e.g., the server 130) using a known interface (such as a universal serial bus interface) and downloads the most recent binary file. In another implementation, the client device 120 utilizes a wireless interface or a cellular network to connect wirelessly to the server 130 (or to another device that has received the file from the server) in order to download the file.

The blocks 210 through 240 can then be repeated for the next prediction period. Note that new and more recent binary files can be generated more frequently than the frequency at which the client device 120 accesses a binary file. That is, for example, the client device 120 may download a new binary file on a weekly basis; however, a new file may be created every four hours (e.g., JPL provides a new seven-day prediction every four hours) or, in general, as frequently as the source data is updated.

Depending on the time it takes to download the source data and generate the binary file, it is possible for the source data to become outdated at the time the binary file is ready. Thus, the server 130 could verify the source data just before issuing a newly generated binary file. Furthermore, some time may pass between the time the file is generated and the time at which the client device 120 downloads the file or uses the information in the downloaded file. During that period, an event may occur that has a significant impact on the manner in which the data in the file should be used. For example, for some reason, the source data for one of the satellites relied upon to generate the data in the file may no longer be satisfactory. Accordingly, the file can be modified to remove data associated with that satellite, or the client device 120 can be instructed to ignore data associated with that satellite.

In block 250 of FIG. 2, with reference also to FIG. 1, at the receiver (client) side, the reverse of the above is essentially implemented in order to reconstruct coefficients, constants and residuals, which can in turn be used to reconstruct the predicted ephemerides and the clock correction terms (e.g., af0, af1 and af2). The type of function (e.g., third-order polynomial) that was used by the server 130 to represent the predicted ephemerides and clock corrections is known to the client device 120. The client device 120 selects the appropriate coefficients, constants and residuals and uses those values with the proper function to calculate the parameter of interest (ephemerides or clock corrections), until all needed values are calculated. The calculated values can then be used by the client device 120 to determine its location in a conventional manner.

The binary data can be extracted from the file in different ways, depending on factors such as the amount of available memory, program space, and processing power. In a device with limited available memory and buffer space, such as a mobile device, the ephemerides and clock corrections can be calculated as needed (e.g., for specific satellites at a given epoch) without having to extract all the data in the binary file at once, thus reducing the requirements placed on the client device. Alternatively, all of the ephemerides and clock corrections represented in the file can be calculated, or some subset (e.g., a sliding window) of values can be calculated. The calculated ephemerides and clock corrections can be converted into a standard format such as the one specified in the ICD-200 (Interface Control Document 200C, "Navstar GPS Space Segment/Navigation User Interfaces").

In block 260 of FIG. 2, the calculated clock correction terms for a particular satellite can be adjusted at the client device 120 (FIG. 1) using broadcast ephemerides (specifically, broadcast clock correction terms) from that satellite, if such broadcast information is available. In other words, if the client device 120 can gain access to more recent clock correction data, then the client device can use that information to correct the clock correction terms calculated in block 250.

Figure 3:
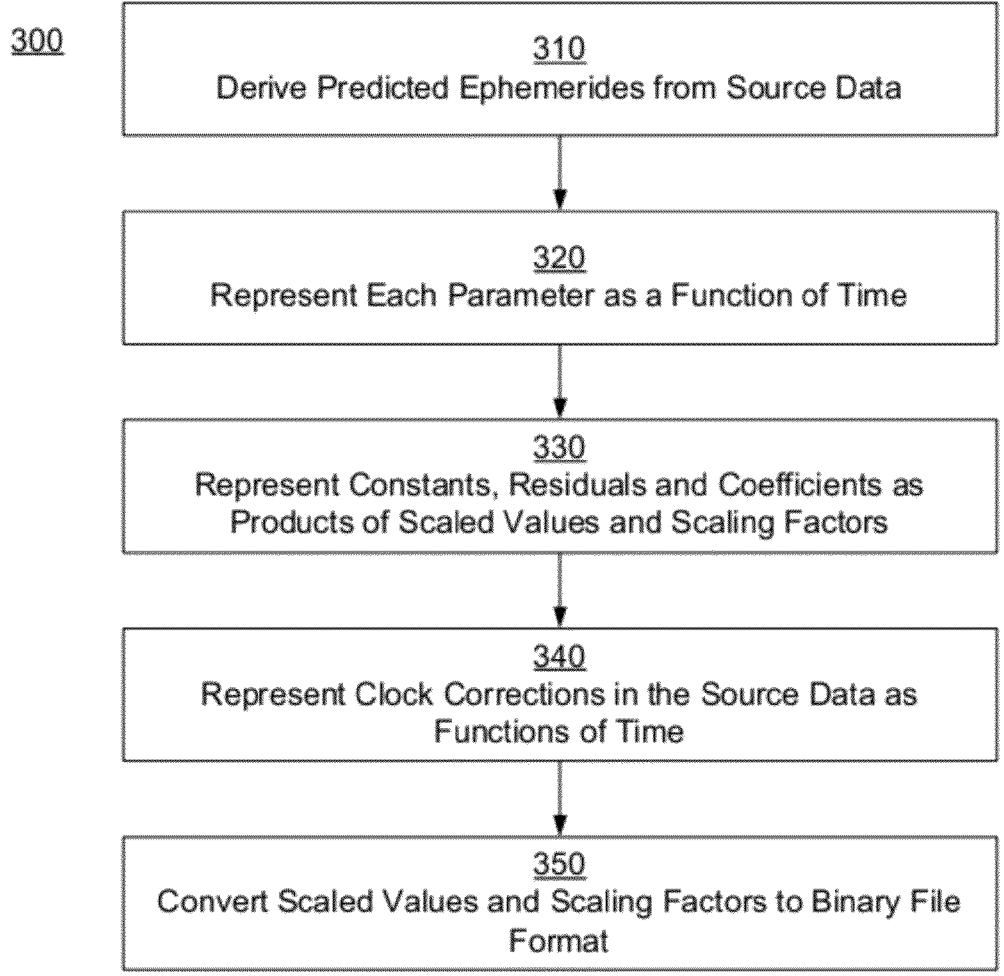
FIGS. 3, 4 and 5 are flowcharts of methods for processing satellite navigation system data according to various embodiments of the invention.
Figure 4:
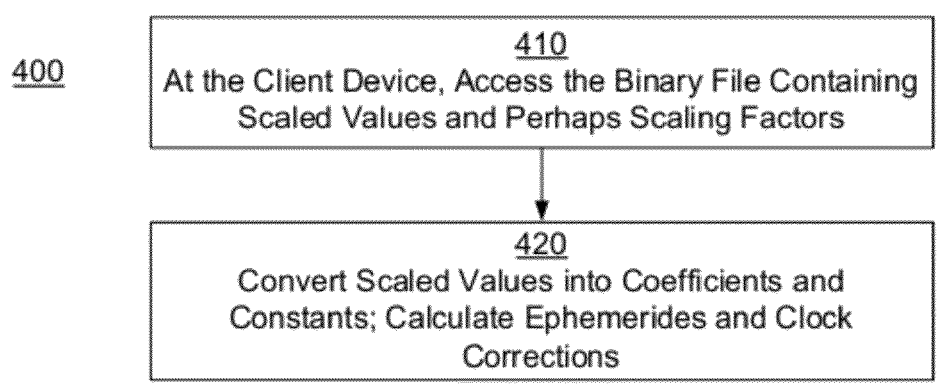
Figure 5:
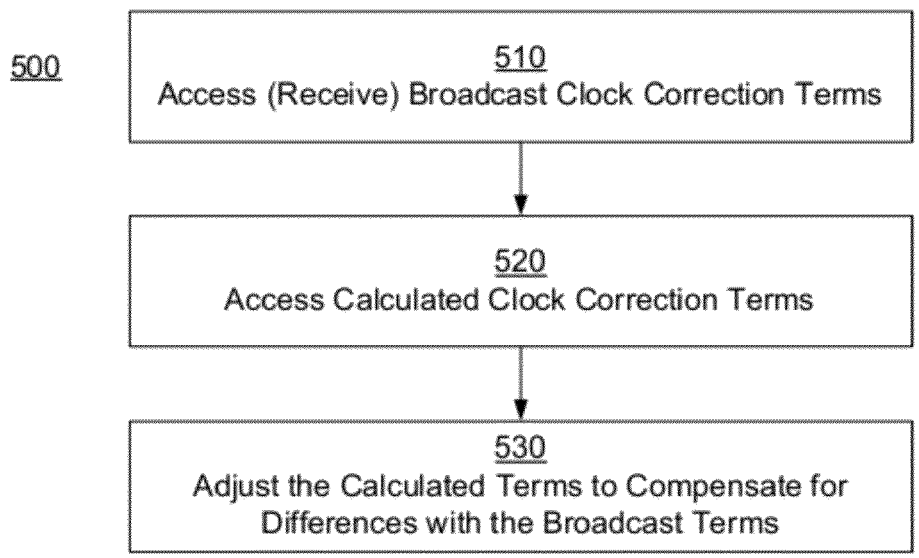

FIGS. 3, 4 and 5 are flowcharts 300, 400 and 500, respectively, of embodiments of methods for processing satellite navigation system data. Although specific steps are disclosed in the flowcharts 300, 400 and 500 (300-500), such steps are exemplary. That is, various other steps or variations of the steps recited in the flowcharts 300-500 can be performed. The steps in the flowcharts 300-500 may be performed in an order different than presented. Furthermore, the features of the various embodiments described by the flowcharts 300-500 can be used alone or in combination with each other. In one embodiment, the flowcharts 300-500 can be implemented as computer-executable instructions stored in a computer-readable medium.

In one embodiment, the process of estimating the ephemeris data and clock corrections and storing that information in a binary file in a format understood by the satellite navigation system receiver (flowchart 300) is performed by the server 130 of FIG. 1. In another embodiment, the process of converting the information in the binary file to ephemeris and clock correction data (flowchart 400) is performed by the client device 120 of FIG. 1. In yet another embodiment, the process of updating clock correction data using broadcast ephemeris data (flowchart 500) is performed by the client device 120.

With reference first to FIG. 3, in block 310, predicted ephemeris data for a plurality of satellites is derived from source data that describes predicted positions of the satellites at selected times. Each satellite orbit can be modeled as a modified elliptical orbit where the ideal two-body Kepler orbit is perturbed by several factors not limited to non-spherical earth gravitational harmonics, solar radiation pressure, lunar and solar gravitation. The satellite position in the modified Keplerian orbit is known to be a function of the parameters listed in Table 1.

TABLE 1

Ephemeris Parameter Definitions

| Parameter/unit | Definition |
| --- | --- |
| $(a)^{1/2}/m^{1/2}$ | Square-root of semi-major axis |
| e/unitless | Orbit eccentricity |
| $i_0$/radians | Inclination angle at reference time |
| $M_0$/radians | Mean anomaly at reference time |
| $\Omega_0$/radians | Longitude of ascending node of orbit plane at reference time |
| $\dot{\Omega}$/radian/s | Rate of right ascension |
| ω/radians | Argument of perigee |
| idot/radians/s | Rate of inclination |
| Δn/radians/s | Mean motion difference from computed value |
| $C_{ic}$/radians | Amplitude of cosine harmonic correction to inclination |
| $C_{is}$/radians | Amplitude of sine harmonic correction to inclination |
| $C_{rc}$/meters | Amplitude of cosine harmonic correction to orbit radius |
| $C_{rs}$/meters | Amplitude of sine harmonic correction to orbit radius |
| $C_{uc}$/radians | Amplitude of cosine harmonic correction to argument of latitude |
| $C_{us}$/radians | Amplitude of sine harmonic correction to argument of latitude |

The parameters in Table 1 are the same set of osculating elements that are provided in a broadcast ephemeris message. To arrive at a best fit to the satellite orbit, the parameters of the model are changed periodically. The sequence of satellite positions and clock corrections are spaced at some interval, usually 15 minutes apart. The parameter estimation at each epoch in the source data can be carried out as an estimation procedure that fits a parameter set to, for example, four or six hours of source data satellite positions centered at that epoch. This results in a set of osculating elements that, when converted to satellite positions, provide precise orbital location at the center epoch and a gradually degrading accuracy at times away from the epoch. Choosing an N-hour sliding window causes the ephemeris elements to be available after N/2 hours from the start and N/2 hours before the end of the source data.

The model equations that describe the conversion from a set of ephemeris parameters to satellite positions in ECEF coordinates are known. However, the process about to be described aims at performing the reverse operation of going from known satellite positions to a set of ephemeris parameters. This can be accomplished using a technique that falls within the broad category known as curve-fitting, or nonlinear, minimization techniques, where a generally nonlinear function is minimized over a space of several parameters of the function. One example of such a technique is the well-known Levenberg-Marquardt minimization procedure.

The ephemeris estimation process can be initialized using any current available broadcast ephemerides as the starting set for the ephemeris parameters to be estimated. However, if broadcast ephemerides are not available, the process can be initialized using previously computed pseudo-ephemeris data (that is, previously predicted ephemerides). In addition, some of the orbit model parameters change so rapidly in time that it may be necessary to initialize using propagated values of those ephemeris parameters. The propagation is based on the approximation of the time derivative of a parameter and on the time difference between the center of the fit window and the epoch of the initializing ephemerides.

The estimation process can be benchmarked with a large set of data to gain an understanding of the behavior of the process. Based on this understanding, criteria for accepting estimation results can be formed. If estimation results do not fall within the criteria, the minimization technique can be repeated with the same input data but using a different step size. Different step sizes can be tried until the range of step sizes is covered or the estimation result is acceptable. In one embodiment, different step sizes are chosen by beginning with the step size that usually yields the best estimation results, and then gradually pulling away from the initial step size by choosing smaller and larger step sizes in alternating fashion. In one embodiment, some number (e.g., five) of different step sizes are specified in advance—if the first step size does not yield acceptable results, then the next step size is automatically invoked.

If all of the different step sizes result in non-typical output quality, the best of the outputs can still be accepted if the deviation from the typical output quality is moderate. Another option is to discard the output because missing samples can be accounted for in the next step (block 320).

The results of block 310 are a set of predicted ephemeris parameters for each satellite at a spacing similar to that of the source data (e.g., at 15-minute intervals). The variation of ephemeris parameters over time due to perturbations on orbital motion can be described in terms of secular, short-periodic and long-periodic effects. Secular effects manifest as a function of time, usually linearly or proportional to some power of time. Secular precession of the orbit is mainly caused by the torque on the orbiting satellite due to the oblateness of the earth. Short-periodic effects have a repeat cycle shorter than the orbital periods of the satellites and are caused by spherical harmonics of the earth's gravitational potential and lunar and solar effects. Long-periodic effects have periods on the order of several weeks or months.

If the source data is available for a week or a few weeks, long-periodic effects can be ignored and the orbital elements can be modeled as a sum of secular and short-periodic effects. This can be achieved by fitting the time sequence of each predicted ephemeris parameter with a time-dependent function (e.g., a polynomial or trigonometric function). It is possible to find very accurate functions to represent each parameter's variation with time. In one embodiment, considering constraints on file size, processing time, complexity and other factors, polynomials of order three or less, or simple trigonometric functions, are used.

In block 320, in one embodiment, each parameter of the predicted ephemeris data (from block 310; clock corrections are discussed in conjunction with block 340) is represented as a function of time. Each parameter can be curve-fitted independently and can be represented using a function different from that of other parameters.

There may be deviations between the true variation of parameters and the fitted curve. The magnitude of these deviations may be quite significant to the accuracy of the satellite positions calculated using the function. Consequently, in one embodiment, the deviations, or residual terms, are calculated and compressed along with the function's coefficients.

In block 330, each coefficient and constant is represented as the product of a scaled value and a scaling factor. In one embodiment, each residual term is similarly represented. The scaled values representing the coefficients and constants may be referred to herein as first scaled values, and the scaled values representing the residuals may be referred to herein as second scaled values. By converting the coefficients, constants and residuals to scaled values (e.g., integer values), they can be represented using fewer bits.

The resolution of the coefficients, constants and residual terms can be selected to reduce the size of the binary file, balanced against the positioning accuracy desired. There can be one scaling factor for each ephemeris parameter per satellite, or one scaling factor for each ephemeris parameter for all satellites. It may be possible to apply the same scaling factors to different sets (periods) of predicted ephemeris data. If so, a set of scaling factors can be provided one time to the client device, perhaps separately from the binary file. Generally speaking, it may be to provide scaling factors to the client device less frequently than or separately from the coefficients, in which case the file can be reduced further in size.

The residual terms can be represented using coarser resolutions than the coefficients, depending on the sensitivity of the satellite position error to each parameter. More specifically, in one embodiment, coefficients and constants reconstructed when the functions are evaluated will have more precision (more significant figures or bits) then the reconstructed residuals. In other words, residuals can be quantized using larger quantization step sizes then those used to quantize model coefficients and constants. This allows flexibility to adjust the size of the binary file because the number of bits needed to represent the residuals can be reduced.

Furthermore, the frequency at which residual terms for the parameters are made available can have a significant impact on the file size. If the residuals are sent every 15 minutes, for example, then the accuracy of the calculated satellite position is comparable to the original accuracy from the source data with some degradation due to curve fitting errors and quantization errors. However, the file size may be larger than desired. It has been found that a frequency of four or six hours for the residuals allows the desired file size to be achieved while maintaining the accuracy to a few meters. For example, in one embodiment, if the predicted ephemeris parameters are determined at 15-minute intervals, then the residuals can also be determined at 15-minute intervals, but then a mean of the residuals can be calculated for each four to six-hour period, compressed as described, and included in the binary file.

In block 340, the time-dependence of the clock corrections provided in the source data for each satellite can be modeled as a sum of polynomial and harmonic curve fits. The harmonic terms in the clock correction arise because the relativistic correction is a sinusoidal function of the eccentric anomaly. The clock correction term in the source (e.g., JPL) data can be curve-fit. The af0, af1 and af2 terms that correspond to the phase error, frequency error, and rate of change of frequency error, respectively, can be derived from the clock correction model when the ephemeris and clock corrections are reconstructed at the receiver. The scaled values representing the coefficients in the curve that was fit to the clock correction term may be referred to herein as third integer values.

In block 350, the scaling factors and signed scaled values from blocks 330 and 340 can be converted to the binary number system and stored in a computer-readable memory.

In block 410 of FIG. 4, the binary file created as just described, and containing scaled values and scaling factors, is accessed by the receiving device (e.g., the client device 120 of FIG. 1), as previously described herein. Alternatively, the scaling factors may be provided separately; that is, they can be provided to the client device 120 in a separate file. The same scaling factors may be used repeatedly, in which case the scaling factors can be provided to the client device 120 at any time (e.g., in advance of the binary file containing the scaled values) and perhaps only once.

In block 420, the scaled values are converted into coefficients, constants, and residuals using the scaling factors. The coefficients, constants and residuals can in turn be used with various time-dependent functions to calculate ephemeris data, including clock corrections, for a number of satellites. More specifically, the calculated ephemerides and clock corrections are relative approximations of the predicted ephemerides and clock corrections that were derived from the source data (e.g., the JPL data).

The calculated ephemerides and clock corrections can be converted to a standard format and subsequently used by the receiving device to determine its location. In essence, the calculated ephemerides and clock corrections can be used in lieu of similar information normally broadcast in navigation messages from satellites. For the period of time that the calculated ephemerides and clock corrections is valid (e.g., one week), the receiving device can operate without having to receive navigation messages from the satellites.

The satellite clock corrections are random effects and the most difficult to predict accurately, and tend to dominate in the error calculations. The predicted, and hence the calculated, clock corrections tend to degrade in accuracy with the number of days since prediction. A method to check the error due to the clock corrections is be to correct the calculated af0, af1 and af2 terms for a specific satellite if the receiver can intermittently download broadcast ephemerides for that satellite.

In block 510 of FIG. 5, broadcast values of clock correction parameters (e.g., af0, af1 and af2) associated with a satellite are accessed by (e.g., received at) a receiving device (e.g., the client device 120 of FIG. 1). The broadcast values correspond to a specific point in time (T1).

In block 520, the receiving device calculates the values (or accesses previously calculated values) of the clock correction parameters by evaluating time-dependent functions using the point in time T1 as an input. That is, the receiving device can calculate values of af0, af1 and af2 at time T1 using the time-dependent functions and the corresponding coefficients and residuals that represent those parameters.

In block 530, in general, the calculated values can be adjusted to compensate for any difference between the calculated values and the broadcast values. Values calculated using later points in time (after time T1) as inputs can be adjusted as well.

In one embodiment, if one set of broadcast clock correction terms becomes available for a satellite during the interval that the synthetic ephemerides are valid, then the difference between the calculated af0 terms from the synthetic clock corrections and from the broadcast ephemerides at the time of broadcast ephemerides (TOE) can be computed and used to adjust the af0 terms in the calculated ephemerides at TOE and for all times beyond TOE until the end of the period covered by the predicted values (e.g., one week). This would be tantamount to a vertical shift in the curve for the calculated af0 term, where the shift is equal to the difference in calculated versus broadcast af0 values.

In another embodiment, if two sets of broadcast clock corrections from two different epochs are available, then in addition to adjusting the af0 term, the af1 term can also be re-computed by fitting a first-order equation through the first and second broadcast af0 values; the value of af1 is equal to the slope (derivative) of that first-order equation. In similar fashion, if three or more broadcast clock correction sets from three different epochs are available, then in addition to adjusting the af0 and af1 terms, the af2 term can also be re-computed by fitting a second-order curve to the first, second and third broadcast af0 values; the af2 term is the second derivate of the second-order curve.

The accuracy of the first and second-order curve-fit approaches may be affected by the random behavior of the satellite clock. The performance of the curve-fit approaches can be improved by increasing the number of broadcast sets used in the curve-fit or by requiring a certain minimal time interval between the broadcast sets selected for use.

Figure 6:
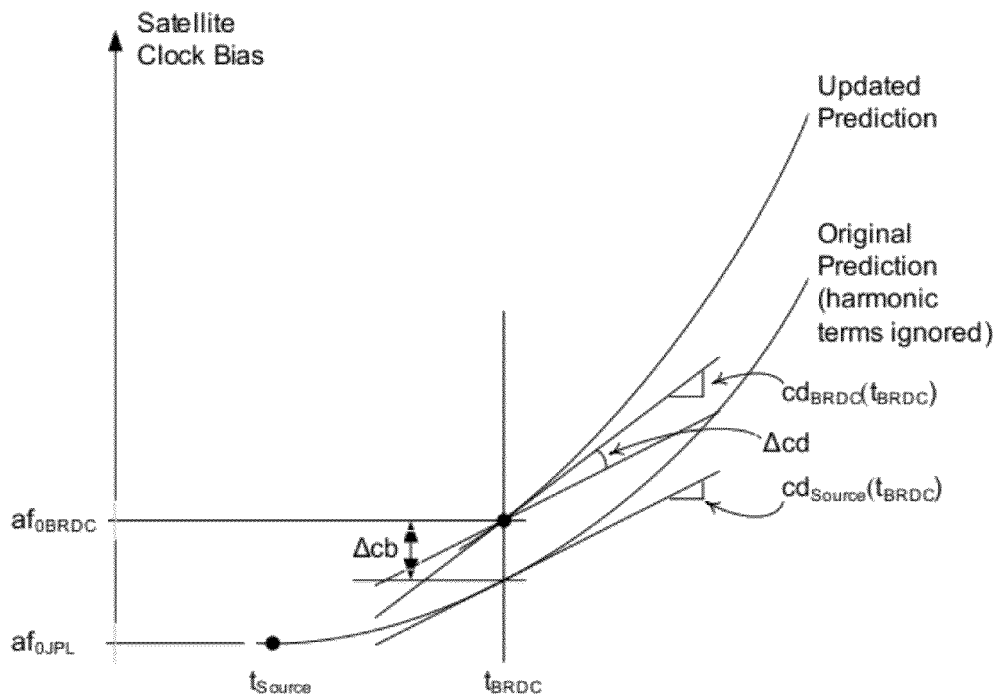
FIG. 6 illustrates updating clock correction terms according to an embodiment of the invention.

In addition to updating just the af0 term using the difference between the calculated af0 terms from the synthetic clock corrections and from the broadcast ephemerides at TOE as described above, both the calculated af0 term and the calculated af1 term can be updated such that the instantaneous clock biases and clock drifts from the prediction are made equal with the broadcast af0 and af1 terms at the epoch of the broadcast clock corrections. FIG. 6 shows the idea of this clock correction method. The curve labeled "Original Prediction" in FIG. 6 refers to the af0, af1 and af2 terms calculated by evaluating a second-order polynomial fitted to the predicted clock bias samples in the source data. First, the value of af0 is updated in a manner similar to that explained above. Then, the value of af1 is updated with the difference of the broadcast af1 ($af_{1BRDC}$) and instantaneous clock drift ($cd_{Source}(t_{BRDC})$). The slope $cd_{BRDC}(t_{BRDC})$ is tangential to the "Updated Prediction" curve at $t_{BRDC}$. The clock frequency drift term af2 is in practice always zero because the satellite clock frequency drift levels are below the resolution of the af2 term in the broadcast ephemeris data format. Therefore, the af2 term in the prediction can be updated, for example, using the curve-fit approach described above.

More specifically, before the update:

clock bias: $cb = af_2(\Delta t)^2 + af_1(\Delta t) + af_0$;

clock drift: $cd = 2af_2(\Delta t) + af_1$;

$cd_{Source}(t_{BRDC}) = 2af_{2,Source}(\Delta t) + af_{1,Source}$;    $|\Delta t = t_{BRDC} - t_{Source}$ $cd_{BRDC}(t_{BRDC}) = 2af_{2BRDC}(\Delta t) + af_{1BRDC}$    $|\Delta t = 0$ $= af_{1BRDC}$;

and after the update ($t \geq t_{BRDC}$):

$cb_{New,Source}(t) = af_{2,Source}(\Delta t)^2 + af_{1New}(\Delta t) + af_{0New}$;    $|\Delta t = t - t_{Source}$ where:

$af_{1NEW} = af_{1,Source} + \Delta cd$ $= af_{1,Source} + cd_{BRDC}(t_{BRDC}) - cd_{Source}(t_{BRDC})$ $= af_{1BRDC} - 2af_{2,Source}(t_{BRDC} - t_{Source})$; and $af_{0NEW} = af_{0BRDC} - af_{2,Source}(t_{BRDC} - t_{Source})^2 - af_{1NEW}(t_{BRDC} - t_{Source})$ $= af_{0BRDC} + af_{2,Source}(t_{BRDC} - t_{Source})^2 - af_{1BRDC}(t_{BRDC} - t_{Source})$.

In the clock correction methods described above, the calculated values of af0 and af1 are replaced with the broadcast values of af0 and af1 at the time of the broadcast ephemerides. Instead of doing this, a weighted average of the instantaneous clock bias and broadcast value of af0, or a weighted average of the instantaneous clock drift and broadcast value of af1, can be used. One option for the weighting is to use inverses of the expected (e.g., statistically determined) variances of the broadcast values of af0 and instantaneous clock biases of the source data prediction (as a function of age of the prediction).

In another embodiment, it is possible to improve the clock correction for a satellite for which broadcast ephemerides are not available but to which a pseudo-range from the satellite navigation system receiver has been determined. This method uses the true receiver position in order to compute the true range from the receiver to the satellite. The true receiver position can be determined using broadcast ephemerides from other satellites; the true position may be obtained if pseudo-ranges and broadcast ephemerides are available for four or more satellites. The difference between the true range and the pseudo-range may be attributed to the clock correction error at that epoch for the satellite of interest.

In summary, according to embodiments of the invention, pseudo-ephemeris data, including clock correction data, is created at a centralized server from a set of predictions of satellite orbits and clock corrections and stored in a binary file that can be accessed by remote client devices. The pseudo-ephemeris data is valid for several days, and the clock corrections and optionally the entire pseudo-ephemeris set can be updated using broadcast ephemerides if available. The pseudo-ephemeris data can be represented using scaled values and scaling factors. The coarseness of the scaling factors can be selected to achieve a desired level of accuracy balanced against a desired amount of data compression. As described herein, the size of the file can be significantly reduced, in turn reducing the amount of time needed to transmit and/or download the file to the client devices, and also reducing the amount of device memory consumed by the file.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method performed by a processor having a computer-readable memory coupled thereto for processing satellite navigation system data, said method comprising:
deriving predicted ephemeris data using said processor for a plurality of satellites using predicted positions of said satellites at selected times;
representing a parameter of said predicted ephemeris data as a first function of time using said processor;
converting i) coefficients of said first function into respective first scaled values and ii) residuals comprising differences between said predicted ephemeris data and values calculated using said first function into respective second scaled values using said processor, said converting performed with scaling factors;

storing said first scaled values and said second scaled values in said computer-readable memory;

accessing clock correction data for said satellites, said clock correction data comprising a plurality of satellite-dependent parameters used as coefficients in a polynomial useful for calculating clock bias per satellite;

representing said clock correction data as a second function of time; and converting coefficients of said second function into respective third scaled values; and transmitting said first, second and third scaled values to a receiving device that is operable for generating reconstructed coefficients and residuals therefrom, wherein said receiving device is further operable to use said reconstructed coefficients and residuals to generate calculated ephemeris and clock correction values, calculated satellite positions, and a location for said receiver device.

2. The method of claim 1 wherein each parameter of said predicted ephemeris data is independently represented as a function of time.

3. The method of claim 1 wherein said first function is a trigonometric function.

4. The method of claim 1 wherein said residuals are calculated for intervals that are longer than the intervals between said selected times.

5. The method of claim 1 further comprising:

accessing said computer-readable memory comprising said first scaled values and said second scaled values;

accessing said scaling factors; and converting said first and second scaled values into reconstructed coefficients and reconstructed residuals, respectively, using said scaling factors, wherein said reconstructed coefficients and reconstructed residuals are useable with said first function to reconstruct said predicted ephemeris data for a plurality of satellites.

6. The method of claim 5 wherein said computer-readable memory further comprises third scaled values that are converted into second coefficients for a polynomial useful for calculating a clock bias for each of said satellites.

7. A method performed by a processor having a computer-readable memory coupled thereto for processing satellite navigation system data, said method comprising:

deriving predicted ephemeris data using said processor for a plurality of satellites using predicted positions of said satellites at selected times;

representing a parameter of said predicted ephemeris data as a first function of time using said processor;

converting i) coefficients of said first function into respective first scaled values and ii) residuals comprising differences between said predicted ephemeris data and values calculated using said first function into respective second scaled values using said processor, said converting performed with scaling factors;

storing said first scaled values and said second scaled values in said computer-readable memory;

accessing said computer-readable memory comprising said first scaled values and said second scaled values; accessing said scaling factors;

converting said first and second scaled values into reconstructed coefficients and reconstructed residuals, respectively, using said scaling factors, wherein said reconstructed coefficients and reconstructed residuals are useable with said first function to reconstruct said predicted ephemeris data for a plurality of satellites;

accessing ephemeris data broadcast from a satellite of said plurality of satellites; and updating an instance of said predicted ephemeris data using said broadcast ephemeris data.

8. A method performed by a processor having a computer-readable memory coupled thereto for processing satellite navigation system data, said method comprising:

deriving predicted ephemeris data using said processor for a plurality of satellites using predicted positions of said satellites at selected times;

representing a parameter of said predicted ephemeris data as a first function of time using said processor;

converting i) coefficients of said first function into respective first scaled values and ii) residuals comprising differences between said predicted ephemeris data and values calculated using said first function into respective second scaled values using said processor, said converting performed with scaling factors;

storing said first scaled values and said second scaled values in said computer-readable memory;

accessing said computer-readable memory comprising said first scaled values and said second scaled values;

accessing said scaling factors;

converting said first and second scaled values into reconstructed coefficients and reconstructed residuals, respectively, using said scaling factors, wherein said reconstructed coefficients and reconstructed residuals are useable with said first function to reconstruct said predicted ephemeris data for a plurality of satellites;

accessing a broadcast value of a clock correction parameter associated with a satellite of said plurality of satellites, said broadcast value corresponding to a first point in time, wherein said clock correction parameter is used as a coefficient in a polynomial useful for determining an amount of bias associated with a clock onboard said satellite;

accessing a calculated value of said clock correction parameter, said calculated value determined by evaluating a time-dependent function using said first point in time as input; and compensating for any difference between said calculated value and said broadcast value.

9. The method of claim 8 wherein said compensating comprises replacing said calculated value with said broadcast value.

10. The method of claim 8 wherein said compensating comprises replacing said calculated value with a weighted average of: i) an amount of clock bias at said first point of time and ii) said broadcast value.

11. A method performed by a processor having a computer-readable memory coupled thereto for processing satellite navigation system data, said method comprising:

deriving predicted ephemeris data using said processor for a plurality of satellites using predicted positions of said satellites at selected times;

representing a parameter of said predicted ephemeris data as a first function of time using said processor;

converting i) coefficients of said first function into respective first scaled values and ii) residuals comprising differences between said predicted ephemeris data and values calculated using said first function into respective second scaled values using said processor, said converting performed with scaling factors;

storing said first scaled values and said second scaled values in said computer-readable memory;

accessing said computer-readable memory comprising said first scaled values and said second scaled values;

accessing said scaling factors;

converting said first and second scaled values into reconstructed coefficients and reconstructed residuals, respectively, using said scaling factors, wherein said reconstructed coefficients and reconstructed residuals are useable with said first function to reconstruct said predicted ephemeris data for a plurality of satellites;

accessing a pseudo-range from a receiving device to a satellite at an epoch;

determining a true range from said receiving device to said satellite at said epoch;

using a difference between said true range and said pseudo-range to determine an amount of bias at said epoch for a clock onboard said satellite.

12. A system comprising:

a processor; and a memory coupled to said processor, said memory having stored therein computer-executable instructions that when executed cause said system to:

derive predicted ephemeris data for a plurality of satellites using predicted positions of said satellites at selected times; represent a parameter of said predicted ephemeris data as a first function of time;

convert coefficients of said first function into respective first scaled values; and convert residuals comprising differences between said predicted ephemeris data and values calculated using said first function into respective second scaled values, wherein said coefficients and residuals are converted using scaling factors;

wherein said instructions also cause said system to: access clock correction data for said satellites, said clock correction data comprising a plurality of satellite-dependent parameters used as coefficients in a polynomial useful for calculating clock bias per satellite; represent said clock correction data as a second function of time; and convert coefficients of said second function into respective third integer values; and wherein said instructions also cause said system to: transmit said first, second and third scaled values to a receiving device that is operable for generating reconstructed coefficients and residuals therefrom, wherein said receiving device is further operable to use said reconstructed coefficients and residuals to generate calculated ephemeris and clock correction values, calculated satellite positions, and a location for said receiver device.

13. A system comprising:

a processor; and a memory coupled to said processor, said memory having stored therein computer-executable instructions that when executed cause said system to:

access a binary file comprising first scaled values and second scaled values;

access scaling factors; and convert said first and second scaled values into coefficients and residuals, respectively, using said scaling factors, wherein said coefficients and residuals are useable with a time-dependent function to reconstruct predicted ephemeris data for a plurality of satellites, wherein said binary file further comprises third scaled values that are converted into second coefficients for a polynomial useful for calculating a clock bias for each of said satellites.

14. A system comprising:

a processor; and a memory coupled to said processor, said memory having stored therein computer-executable instructions that when executed cause said system to:

access a binary file comprising first scaled values and second scaled values;

access scaling factors; and convert said first and second scaled values into coefficients and residuals, respectively, using said scaling factors, wherein said coefficients and residuals are useable with a time-dependent function to reconstruct predicted ephemeris data for a plurality of satellites, wherein said instructions also cause said system to:

access ephemeris data broadcast from a satellite of said plurality of satellites; and update an instance of said predicted ephemeris data using said broadcast ephemeris data.

15. A system comprising:

a processor; and a memory coupled to said processor, said memory having stored therein computer-executable instructions that when executed cause said system to:

access a binary file comprising first scaled values and second scaled values;

access scaling factors; and convert said first and second scaled values into coefficients and residuals, respectively, using said scaling factors, wherein said coefficients and residuals are useable with a time-dependent function to reconstruct predicted ephemeris data for a plurality of satellites, wherein said instructions also cause said system to:

access a broadcast value of a clock correction parameter associated with a satellite of said plurality of satellites, said broadcast value corresponding to a first point in time, wherein said clock correction parameter is used as a coefficient in a polynomial useful for determining an amount of bias associated with a clock onboard said satellite;

access a calculated value of said clock correction parameter, said calculated value determined by evaluating a time-dependent function using said first point in time as input; and compensate for any difference between said calculated value and said broadcast value.

16. The method of claim 1 wherein said first function is an N-order polynomial function with N not greater than three.

* * * * *